United States Patent Office 2,958,713
Patented Nov. 1, 1960

2,958,713

METHOD OF PRODUCING p-MENTHENE-3 FROM CARVOMENTHENE

Robert R. Bottoms, Crestwood, Ky., assignor to Chemetron Corporation, Chicago, Ill., a corporation of Delaware No Drawing. Filed Aug. 22, 1957, Ser. No. 679,758

16 Claims. (Cl. 260—666)

This invention relates to a method of producing p-menthene-3 from carvomenthene. More particularly, it relates to a method of producing p-menthene-3 from carvomenthene by isomerization in the presence of an organic sulfonic acid.

This application is a continuation-in-part of my copending application Serial No. 489,756, filed February 21, 1955.

p-Menthene-3 is a terpene hydrocarbon having the formula:

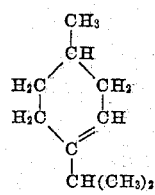

It is a useful starting material in the preparation of synthetic menthol and has heretofore been relatively inaccessible. It has been found to exist naturally in very small quantities in the oil of *Pittosporum resiniferum*. It has also been produced synthetically in small quantities from menthol or menthyl chloride. Heretofore a synthetic procedure for producing menthene on a commercial scale from readily available starting materials has not been described.

It is the object of this invention to provide a method of producing p-menthene-3 from readily available materials. It is a further object to provide a method of producing menthene by a simple process and in high yield from readily available starting materials. It is an additional object to provide a method of producing p-menthene-3 from limonene and its isomers and materials readily produced from limonene, such as carvomenthene.

Carvomenthene is a terpene hydrocarbon having the structural formula

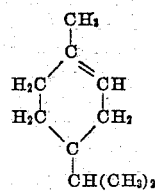

It is also known as Δ¹-p-menthene, p-menthene-1, and dihydrolimonene. It can readily be produced from limonene or dipentene by catalytic hydrogenation. After one mole of hydrogen is absorbed, the reaction can be stopped at that point, producing the above terpene hydrocarbon. A second mole of hydrogen is rather slowly absorbed so that it is a simple matter to stop the reaction at carvomenthene.

The present invention is based upon the discovery that the double bond in the 1,2-position in the carvomenthene molecule may be caused by appropriate treatment to migrate to the 3,4-position in the ring, forming the desired p-menthene-3. The process of the present invention has several advantages in that the process is simple and inexpensive to carry out, the yields of p-menthene are high, only small quantities of by-products are produced, and the starting materials are cheap and readily available.

Broadly, the present invention comprises heating carvomenthene with a catalytic amount of an organic sulfonic acid at a temperature in the range of about 100° to 180° C. for a period of time varying from about 1 hour to about 5 hours to affect the catalytic conversion of carvomenthene to menthene. The desired menthene is separated from the terpene fraction after the acid has been removed by washing with water or dilute alkali. The separation is preferably carried out by fractional distillation, the desired p-menthene-3 distilling at a lower temperature than carvomenthene. The unchanged carvomenthene which remains in the still can be retreated with sulfonic acid to produce further quantities of menthene. By recovering the unreacted carvomenthene and subjecting it to further isomerization it is possible to obtain high yields of p-menthene-3. It is generally not feasible to attempt to carry the isomerization reaction to completion, since an equilibrium is set up at a point where about one-third to one-half of the carvomenthene has been isomerized to menthene and beyond that point conversion of carvomenthene to menthene is very slow. Nevertheless, by separating the p-menthene-3 and recycling the unreacted carvomenthene a high conversion can be achieved.

Among the organic sulfonic acids which are suitable as catalysts in isomerization are hydrocarbon sulfonic acids, such as benzenesulfonic and toluenesulfonic acids and lower alkane-sulfonic acids such as the commercially available alkanesulfonic acid which comprises a mixture of methanesulfonic, ethanesulfonic, and propanesulfonic acids. Cation exchange resins of the sulfonated type are also suitable as catalysts, including sulfonated cross-linked polystyrene copolymers, sulfonated phenolformaldehyde resins and sulfonated coal. The sulfonated resins are insoluble in the terpene hydrocarbons, and are readily separated from the terpenes when the isomerization is complete.

The range of temperatures in which the isomerization can be conducted is fairly wide, varying from about 100° C. to the boiling point of the terpenes, which is about 180° C. To avoid decomposition the temperature should be kept below the boiling point of p-menthene-3. Preferably the reaction is carried out in the range of 130° to 140° C. The time of the reaction may vary from less than an hour to five hours, two hours being the optimum time for establishing equilibrium. Longer periods of time than five hours may be used but it is inefficient to conduct the isomerization over a longer period of time because of the equilibrium condition which exists. The amount of sulfonic acid added to the reaction mixture can be very small since only catalytic amounts are necessary and the acid is not consumed, diluted or otherwise destroyed during reaction. Generally, sulfonic acid amounting to about 3% by weight of terpene is used but amounts in the range of 1% to more than 5% by weight are satisfactory.

At the end of the isomerization reaction the p-menthene-3 is separated from the carvomenthene. This is preferably done by fractional distillation due to a significant difference in boiling points of the two materials. The carvomenthene distills at a temperature of about 173° to 175° C. whereas p-menthene-3 distills in the range of 166° to 168° C. at 760 millimeters pressure. The latter therefore can be readily separated by fractional distillation. The unchanged carvomenthene which remains in the still can be further isomerized by treatment with a catalytic amount of organic sulfonic acid at a temperature in the range stated above, or it can be rectified and recovered by distillation. By repeated fractional distillation and reisomerization of the high boiling residue it is possible to convert nearly all of the carvomenthene to p-menthene-3.

The invention is further disclosed by the following example which is provided for the purpose of illustrating the invention. It is understood that other sulfonic acids may be used and the amounts of materials and the conditions of reaction may be varied without departing from the invention. Relative amounts of materials are given in parts by weight and temperatures are recorded in degrees centigrade.

*Example*

1000 parts of limonene are placed in an autoclave with 15 parts of Raney nickel catalyst and heated to about 120° C. Hydrogen is introduced to the autoclave until a pressure of about 250 lbs. per square inch is reached. Agitation is commenced and the absorption of hydrogen is quite rapid. When one mole of hydrogen is absorbed for each mole of limonene taken, the agitation is stopped, the autoclave cooled and the contents removed. The catalyst is removed from the reaction mixture. The product consists almost entirely of carvomenthene and is suitable for use in the next step.

The hydrogenation product is distilled and the fraction distilling at 170–175° C. is mixed with 3% by weight of toluenesulfonic acid and heated and agitated at 135° C. for two hours. The mixture is washed to remove acid, dried and fractionally distilled. The fraction distilling at 166–168° C. at 760 millimeters pressure is collected as p-menthene-3 and amounts to about 35% of the total material treated. The unreacted carvomenthene can be distilled for further use or it may be retreated as above with 3% by weight of toluenesulfonic acid.

What is claimed as new and desired to be secured by Letters Patent of the United States is:

1. A method of producing p-menthene-3 from carvomenthene which comprises heating carvomenthene in liquid phase with an organic sulfonic acid and separating the p-menthene-3 thus formed.

2. A method of producing p-menthene-3 from carvomenthene which comprises heating carvomenthene in liquid phase to a temperature below the boiling point of p-menthene-3 with an organic sulfonic acid selected from the group consisting of aromatic hydrocarbon sulfonic acids, aliphatic hydrocarbon sulfonic acids and sulfonated organic resins, and separating the p-menthene-3 thus formed.

3. A method of producing p-menthene-3 from carvomenthene which comprises heating carvomenthene in liquid phase to a temperature below the boiling point of p-menthene-3 with a catalytic amount of a sulfonated organic resin and separating the p-menthene-3 thus formed.

4. A method of producing p-menthene-3 from carvomenthene which comprises heating carvomenthene in liquid phase to a temperature below the boiling point of p-menthene-3 with an organic hydrocarbon sulfonic acid and separating the p-menthene-3 thus formed.

5. A method of producing p-menthene-3 from carvomenthene which comprises heating carvomenthene in liquid phase to a temperature below the boiling point of p-menthene-3 with a catalytic amount of an organic hydrocarbon sulfonic acid and separating the p-menthene-3 thus formed.

6. A method of producing p-menthene-3 from carvomenthene which comprises heating carvomenthene in liquid phase to a temperature below the boiling point of p-menthene-3 with 1% to 5% by weight of an organic hydrocarbon sulfonic acid and separating the p-menthene-3 thus formed.

7. A method of producing p-menthene-3 from carvomenthene which comprises heating carvomenthene in liquid phase with not more than 5% by weight of an organic hydrocarbon sulfonic acid at a temperature above 100° C. and below about 180° C. and separating the p-menthene-3 thus formed.

8. A method of producing p-menthene-3 from carvomenthene which comprises heating carvomenthene in liquid phase with toluenesulfonic acid at a temperature above 100° C. and below about 180° C. and separating the p-menthene-3 thus formed.

9. A method of producing p-menthene-3 from carvomenthene which comprises heating carvomenthene in liquid phase with toluenesulfonic acid at a temperature above 100° C. and below about 180° C. for a period of not longer than 5 hours and separating the p-menthene-3 thus formed.

10. A method of producing p-methenne-3 from carvomenthene which comprises heating carvomenthene in liquid phase with 1% to 5% by weight of toluenesulfonic acid at a temperature above 100° C. and below about 180° C. for a period of not longer than 5 hours and separating the p-menthene-3 thus formed.

11. A method of producing p-menthene-3 from carvomenthene which comprises heating carvomenthene in liquid phase with about 3% by weight of toluenesulfonic acid at a temperature above 100° C. and below about 180° C. for a period of not longer than 5 hours and separating the p-menthene-3 thus formed.

12. A method of producing p-menthene-3 from carvomenthene which comprises heating carvomenthene in liquid phase with about 3% by weight of toluenesulfonic acid at a temperature above 100° C. and below about 180° C. for a period of not longer than 5 hours, removing the acid, and separating the p-menthene-3 thus formed.

13. A method of producing p-menthene-3 from carvomenthene which comprises heating carvomenthene in liquid phase with about 3% by weight of toluenesulfonic acid at a temperature above 100° C. and below about 180° C. for a period of not longer than 5 hours, washing the hydrocarbon mixture to remove acid, and separating the p-menthene-3 thus formed.

14. A method of producing p-menthene-3 from carvomenthene which comprises heating carvomenthene in liquid phase with about 3% by weight of toluenesulfonic acid at a temperature above 100° C. and below about 180° C. for a period of not longer than 5 hours, washing the hydrocarbon mixture to remove acid, and separating the p-menthene-3 by fractional distillation.

15. A method of producing p-menthene-3 from carvomenthene which comprises heating carvomenthene to a temperature below the boiling point of p-menthene-3 with an organic aromatic hydrocarbon sulfonic acid and separating the p-menthene-3 thus formed.

16. A method of producing p-menthene-3 from carvomenthene which comprises heating carvomenthene to a temperature below the boiling point of p-menthene-3 with 1% to 5% by weight of an organic aromatic hydrocarbon sulfonic acid and separating the p-menthene-3 thus formed.

References Cited in the file of this patent

UNITED STATES PATENTS

| Number | Name | Date |
|---|---|---|
| 1,921,138 | Schoeller et al. | Aug. 8, 1933 |
| 2,554,251 | Hudson | May 21, 1951 |
| 2,591,367 | McAllister | Apr. 1, 1952 |
| 2,785,208 | Bain et al. | Mar. 12, 1957 |
| 2,846,486 | Rummelsburg | Aug. 5, 1958 |